United States Patent [19]

Mölders et al.

[11] Patent Number: 4,466,514

[45] Date of Patent: Aug. 21, 1984

[54] CYLINDER-PISTON DEVICE

[75] Inventors: Werner Mölders, Plaidt; Herbert Freitag, Koblenz-Metternich, both of Fed. Rep. of Germany; Lawther O. Smith, Doylestown, Pa.

[73] Assignee: Stabilus GmbH, Koblenz-Neuendorf, Fed. Rep. of Germany

[21] Appl. No.: 469,792

[22] Filed: Feb. 25, 1983

[30] Foreign Application Priority Data

Dec. 18, 1979 [DE] Fed. Rep. of Germany ....... 2950888

[51] Int. Cl.³ .............................................. F16F 9/19
[52] U.S. Cl. .................................................. 188/320
[58] Field of Search ............... 188/281, 282, 319, 320, 188/322.15

[56] References Cited

U.S. PATENT DOCUMENTS 3,323,550  6/1967  Lee .
4,060,200  11/1977  Mehoudar .
4,209,133  6/1980  Mehoudar .
4,215,822  8/1980  Mehoudar .

FOREIGN PATENT DOCUMENTS 2751046  12/1978  Fed. Rep. of Germany .
2950888   6/1981  Fed. Rep. of Germany .
48-21378   6/1973  Japan .
49-49332  12/1974  Japan .
 728495   4/1955  United Kingdom .
1525407   9/1978  United Kingdom .

Primary Examiner—Duane A. Reger
Attorney, Agent, or Firm—Brumbaugh, Graves, Donohue & Raymond

[57] ABSTRACT

In the illustrative embodiments of the invention disclosed, the piston unit of a gas spring incorporates a meander-shaped fluid passage for interconnecting the working chambers on either side of the piston unit so as to dampen movement of the piston rod relative to the cylinder. The meander-shaped passages may be constituted by a sequence of passage sections arranged at right angles to one another and, in one embodiment, are formed in the end faces of the piston member so as to lie in planes transverse to the axis of the cylinder. If desired, additional fluid passage units may be connected in series to provide an enhanced damping effect.

16 Claims, 8 Drawing Figures

CYLINDER-PISTON DEVICE

BACKGROUND OF THE INVENTION

Related Application

This application is a continuation-in-part of U.S. application Ser. No. 214,654 filed Dec. 9, 1980, now abandoned, claiming the priority or an application filed in the Federal Republic of Germany on Dec. 18, 1979, Ser. No. P 29 50 888.1.

Field of the Invention

The invention relates to fluid-damped cylinder-piston devices and pertains in particular to a new and improved structure for incorporation in the piston unit of such devices to effect controlled and reliable fluid damping of the devices.

The Prior Art

Cylinder-piston devices are known, as shown for example, in German Utility Model No. 78 33 144, in which fluid damping is accomplished by means of one or more throttle bores provided through the piston of the unit in parallel to the axis of the cylinder. Typically, these throttle bores are of very small cross-sectional area in order to ensure that the desired damping effect is brought about when the piston rod is moved with respect to the cylinder. In case of gas springs, i.e., where the damping fluid is a pressurized gas, the diameter of such throttle bores is very small, e.g. approximately 0.3 to 0.4 mm. On account of this narrow cross-section, the throttle bores are very susceptible to blockage carried by contaminants in the fluid. Furthermore, these throttle bores have to be produced with great precision so as to ensure that the desired damping effect is kept within the required limits.

SUMMARY OF THE INVENTION

It is an object of the present invention, therefore, to provide a cylinder-piston device in which the desired damping effect can be achieved by fluid passage means having a considerably larger cross-sectional area than that used in the hitherto usual cylinder-piston devices, so as to facilitate the manufacture of the fluid-passage means and to prevent the passage means from being blocked by contaminants in the fluid.

It is a further object of the invention to provide the improved fluid passage structure in the piston unit of the fluid spring device in such a way that the piston unit can be manufactured in a simple and economical manner, as, for example, according to a sintering technique or a plastic molding technique.

These and other objects of the invention are attained by the provision of fluid passage structure in the piston unit of a cylinder-piston device which is defined by a substantially wave-shaped or meander-shaped sequence of passage sections. In such a substantially wave-shaped or meander-shaped sequence of passage sections, the damping medium is frequently deflected. This results in a high damping resistance while simultaneously providing the possibility of designing the cross section of the passage sections considerably larger than the cross section of throttle bores in known devices. Thus clogging caused by contaminants in the damping medium is avoided. If desired, subsequent passage sections may be interconnected by turbulence chambers for the purpose of increasing the flow resistance of the passage means.

According to a preferred embodiment of the invention, a portion or all of the wave-shaped or meander-shaped sequence of passage sections are arranged in a plane substantially perpendicular to the axis of the cylinder. These sections are formed in the end faces of a piston member and are interconnected at least at their inner ends by a single bore extending axially through the piston member. Alternatively, the single bore may be located at a point along the sequence of passage sections other than at their inner ends, or at their inner ends as well as at another location or locations along the passage. Advantageously, the passage sections lie in the planes of the end faces transversely to the axis of the cylinder and are covered in a fluid tight manner by cover discs which overlie the end faces of the piston member.

BRIEF DESCRIPTION OF THE DRAWINGS

Further objects and advantages of the invention will be apparent from the following description of exemplary embodiments of the invention, taken in conjunction with the accompanying drawings, in which.

DETAILED DESCRIPTION

A gas spring forms a pneumatic unit which has a thrust force that corresponds to the product of the piston rod cross-sectional area and the gas pressure. Gas springs of this kind are installed, for example, as actuating aids for opening a lid swinging about a horizontal axis. In order to avoid abrupt piston-rod movements, such gas springs are typically provided with damping structure inside the piston. The damping structure of the present invention has particular application to the piston units of gas springs and, for illustrative purposes, is described herein by reference to the use thereof in gas springs. It will be understood, however, that the invention has application to other types of fluid springs and cylinder-piston devices as well.

Figure 1:
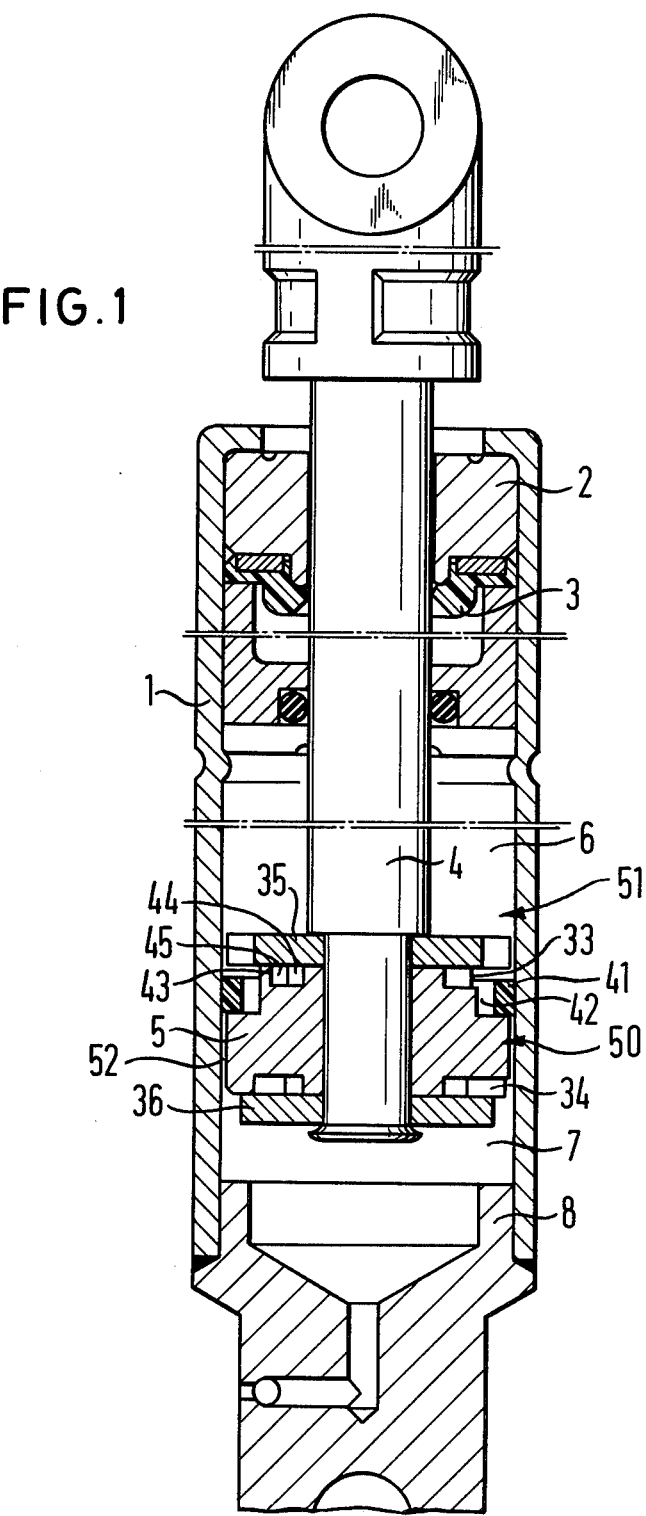
FIG. 1 is a longitudinal sectional view of a gas spring incorporating the novel fluid-damping structure of the invention.

The gas spring shown in FIG. 1 comprises a cylinder 1 in which there slides a piston unit 50 which is connected to the piston rod 4. At one end of the cylinder 1, there are arranged the piston rod guide 2 and the piston rod seal 3. The cavity 51 of the cylinder 1 is divided by the piston unit 50 into the working chamber 6, which is provided between the piston unit 50 and the piston rod guide 2, and a working chamber 7, which is provided between the piston unit 50 and the cylinder bottom 8.

An upper cover disc 35 and a ring-shaped recess in the piston member 5 define an annular groove 42, in which the piston ring 41 is arranged so as to be axially movable to a limited extent with respect to the piston unit 50. The cover disc 36 is located on the lower front face of the piston member 5. Between the working chamber 6 and the working chamber 7 there is provided a tortuous damping passage, more fully described hereinbelow in connection with FIGS. 2-4, whose upper opening is formed by the inlet slot 33 and whose lower opening is formed by the outlet slot 34.

Figure 2:
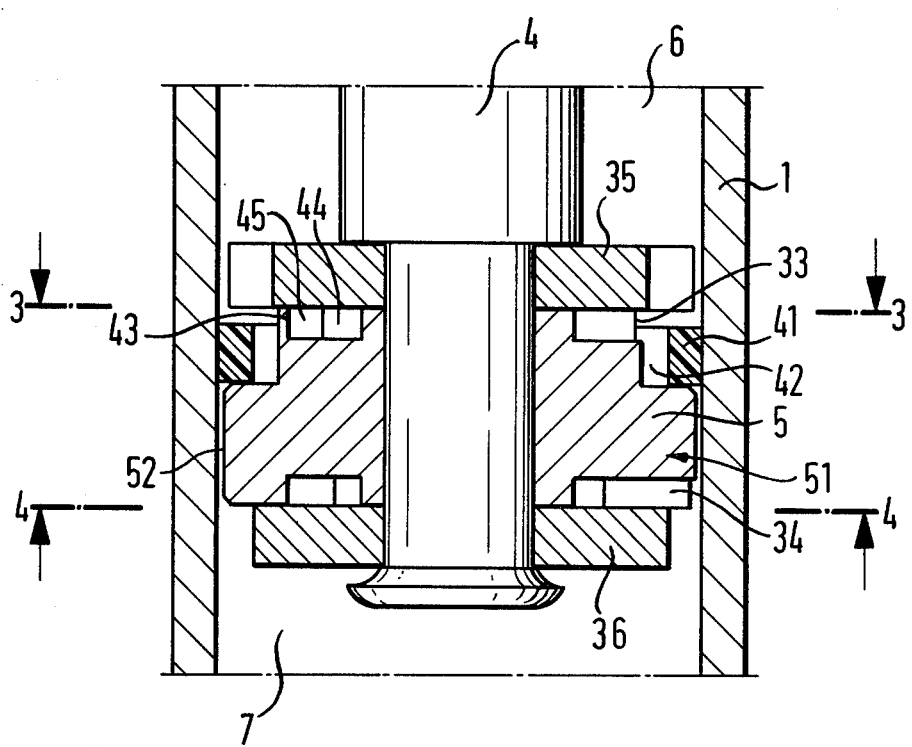
FIG. 2 is an enlarged sectional representation of the piston unit of the gas spring shown in FIG. 1.

The design and the mode of operation of the damping device will be explained in more detail with reference to FIGS. 2, 3 and 4. As the piston rod 4 is pushed outward from the cavity 51, the damping fluid, namely a pressurized gas, displaced from the working chamber 6 passes through the inlet slot 33 into the damping passage of the piston unit 50 and enters the working chamber 7 at the outlet slot 34. During this movement of the piston rod 4, the piston ring 41, which is axially movable in the piston ring groove 42 and which frictionally engages the wall of the cylinder 1, is in the position shown in FIG. 2 and thus closes the annular gap 52 between the piston member 5 and the cylinder 1. During this outward movement, therefore, the damping medium can pass from the working chamber 6 into the working chamber 7 only through the tortuous damping passage leading between the inlet slot 33 and the outlet slot 34.

Figure 3:
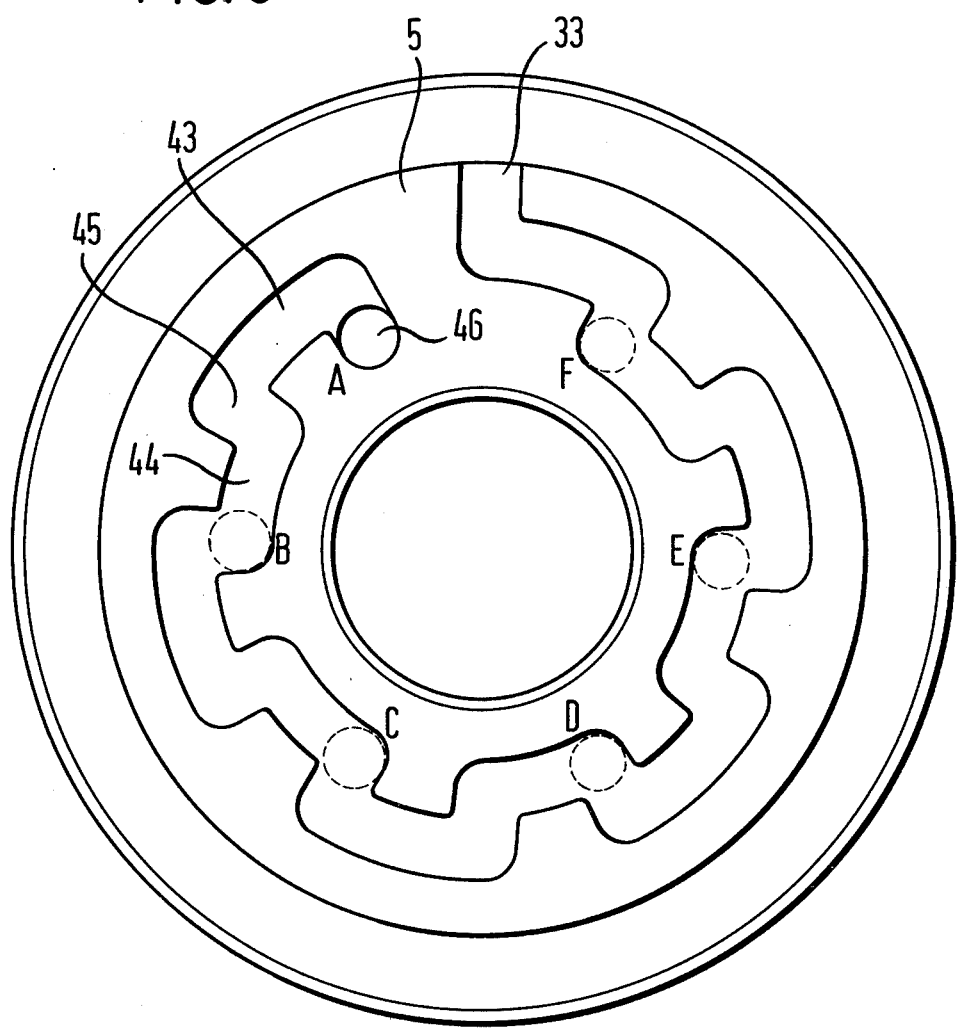
FIG. 3 is a top view of the piston unit shown in FIG. 2, taken along the line 3—3 and showing the inlet side of the fluid-passage structure.
Figure 4:
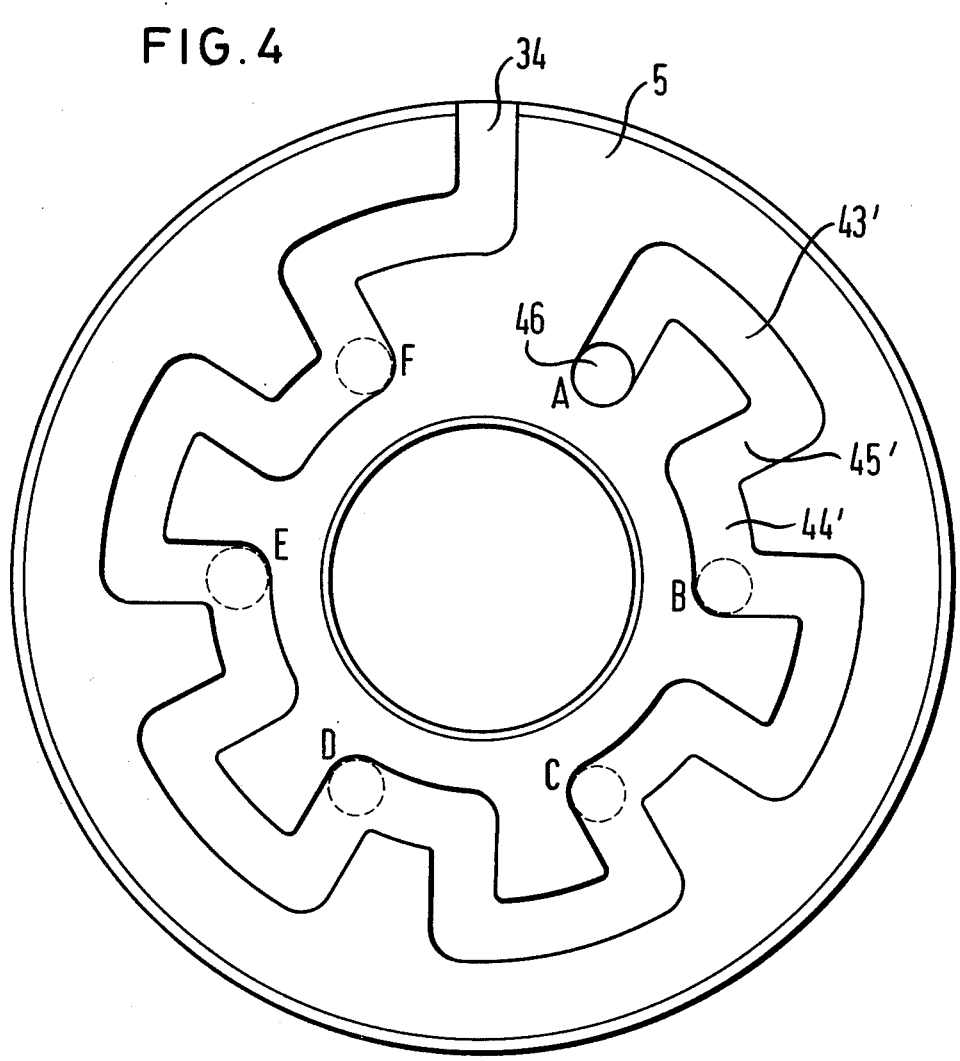
FIG. 4 is a bottom view of the piston unit shown in FIG. 2, taken along the line 4—4 and showing the outlet side of the fluid-passage structure.

FIGS. 3 and 4 show the run of the tortuous or meander-shaped throttling passage parts in the piston member 5. The piston member 5 is shown in both figures without the cover discs 35 and 36 shown in FIG. 2. The piston face which FIG. 3 shows is usually covered by the cover disc 35 and is accordingly adjacent to the working chamber 6. The damping medium passes through the inlet slot 33 into the channel system which is formed by the radially exterior channel sections 43, the radial channel sections 45 and the radially interior channel sections 44. Due to the arrangement of these channel sections, as is apparent from FIG. 3, there is formed a throttling passage which extends in meander shape and which opens out at its end into the bore 46. The other end of the bore 46 is connected to a like meander-shaped passage located in the lower front face of the piston member 5. This lower front face of the piston member 5 is shown in FIG. 4 and is also provided with radially exterior channel sections 43', which extend in the circumferential direction, radial channel sections 45', radially interior channel sections 44', and an outlet slot 34. Due to the length and the repeated change of direction of the fluid within the meander-shaped passages, a very good damping effect is attained notwithstanding that a relatively large cross-sectional area can be used for the channel sections and for the connecting bore 46.

It should be noted that more than one axial passage may be provided to connect the two meander-shaped passages, or if only one bore is provided, its location may be other than the inner end of the passages. For example, the axial bores may be located at one or more of the various positions A–F indicated in the dotted lines in FIGS. 3 and 4, or at one or more of those positions in addition to the innermost location as indicated in solid lines in the figure (A at 46). Obviously, by varying the number and location of the axial bore(s) connecting the meander-shaped sequences, the damping characteristic of the gas spring may be varied.

It will be appreciated by those skilled in the art that, when viewed from the same axial direction, the meander-shaped channels on both sides of the piston unit 50 are in alignment; i.e., the upper face radially interior sections 44 overlie the lower face radially interior sections 44'.

The ability to use large cross-sectional damping passages greatly reduces the likelihood of clogging or obstruction of the damping passage by contaminants in the damping fluid. It also facilitates manufacture of the piston unit 50 by eliminating the need for the very small damping orifices and bores heretofore required. As a further safeguard against clogging, the inlet and outlet slots 33 and 34 are preferably smaller in cross section than the channels and bore 46. The inlet and outlet slots 33 and 34 also each may be designed as two adjacent radial channels. Each radial channel in that event would have a cross sectional area which is smaller than the cross sectional area of the damping passages. Any particles small enough to enter the damping passages, therefore, will be able to pass therethrough.

When the piston rod 4 is pressed into the cavity 51, the piston ring 41 abuts the upper cover disc 35 as a result of the friction on the inside wall of the cylinder 1, so that an additional flow passage 52, 42 (see FIG. 1) having a relatively large flow cross section is available. Inward movement of the piston-rod, therefore, is substantially undamped. It will be observed that as the fluid enters the flow passage via the inlet 33, it flows in a clockwise direction. After flowing through the axial bore 46, this direction of flow is reversed, which also enhances the damping characteristic of the device.

Figure 5:
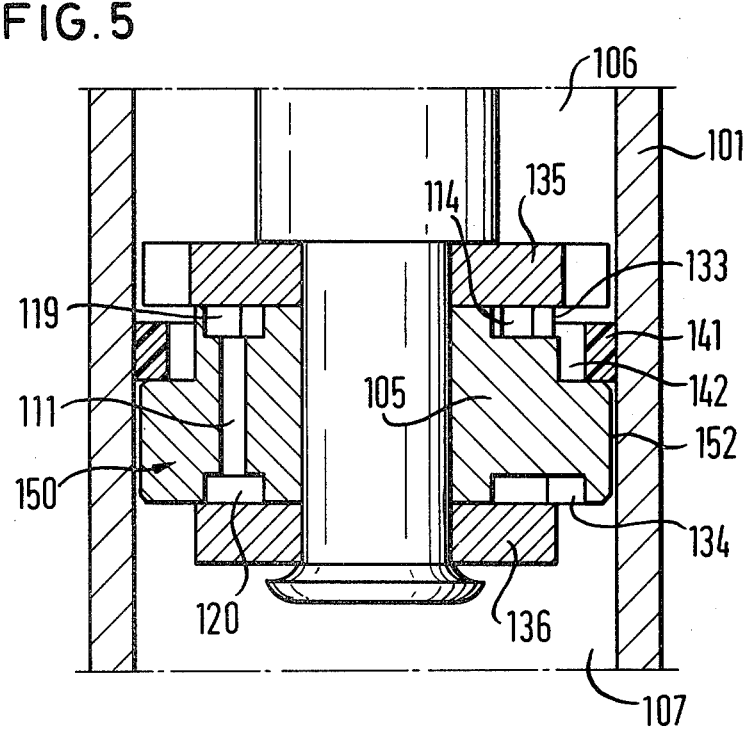
FIG. 5 is an enlarged sectional view of the piston unit showing another embodiment of the novel fluid-passage structure of the invention.
Figure 6:
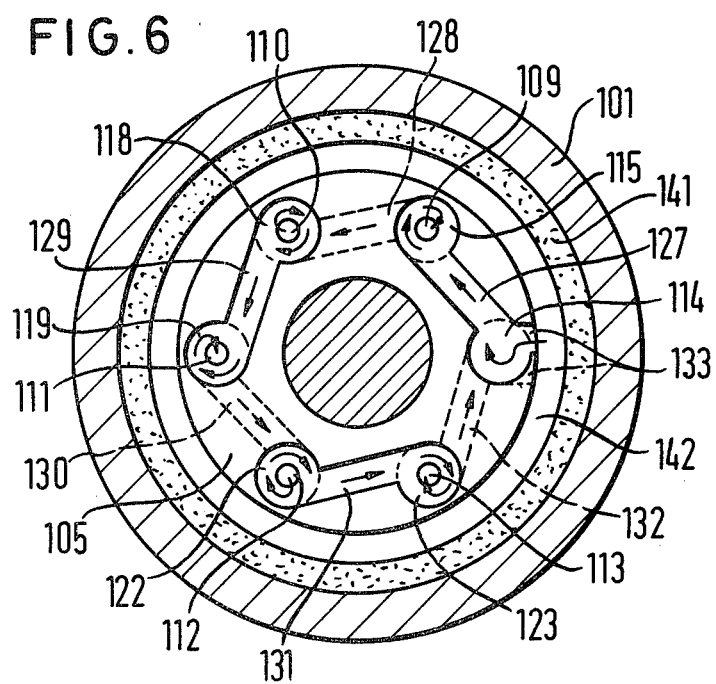
FIG. 6 is a top view of the piston unit shown in FIG. 5, taken along the line 6—6 and showing the inlet side of the fluid-passage structure.
Figure 7:
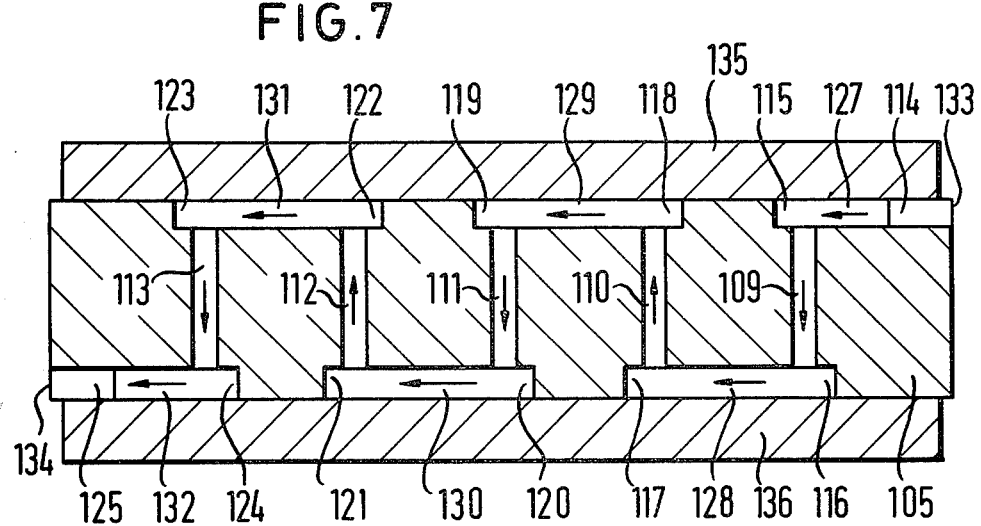
FIG. 7 is a diagrammatical representation of the passage structure in the piston unit according to FIGS. 5 and 6.

In the embodiment of the damping device shown in FIGS. 5, 6 and 7, the inlet slot 133 opens into a turbulence chamber 114. An interconnection channel 127 leads from the chamber 114 to a second, turbulence chamber 115 and is so arranged relative thereto that fluid flow into the turbulence chamber 115 is substantially tangential to the wall thereof. A throttling bore 109 in the member 105 connects the turbulence chamber 115 to a lower turbulence chamber 116, as shown in FIG. 7.

FIG. 7 illustrates the damping flow passage in the piston unit 150 as it would appear if laid out in a straight line instead of in a circle as shown in FIG. 6. From FIG. 7, it is evident that the turbulence chambers 116 and 117 are interconnected by a channel 128, which is shown in broken lines in FIG. 6. From the chamber 117, the damping medium passes through the throttle bore 110, the turbulence chamber 118 and the interconnection channel 129 to the turbulence chamber 119, and from there through the throttle bore 111 to the turbulence chamber 120. The damping medium further flows through the interconnection channel 130, the turbulence chamber 121, the throttle bore 112, the turbulence chamber 122, the interconnection channel 131, the turbulence chamber 123, the throttle bore 113, the turbulence chamber 124, the connection channel 132 and the turbulence chamber 125 to the outlet slot 134.

The turbulence chambers 114 to 125 and the interconnection channels 127 to 132 are covered by the cover disc 135 at the top face and the cover disc 136 at the bottom face of the piston member 105. It will be understood that the discs 135 and 136 contact the respective faces of the piston member 105 in a fluid tight manner. The same is of course true for the discs 35 and 36 of the embodiment of FIGS. 1–4. The lower cover disc 136 forms, together with the piston member 105, the outlet slot 134.

The damping passage connecting the inlet slot 133 and the outlet slot 134 represents a continuously open connection between the working chambers 106 and 107, effecting a damping during the outward movement of the piston-rod 104. As shown in FIG. 5, the piston ring 141 bears, on outward movement of the piston rod, against the piston member 105 and covers the annular gap 152 formed by the cylinder 101 and the piston member 105. Thus, during this outward movement, the pressurized gas flows from the working chamber 106 into the working chamber 107 only through the aforementioned, constantly open damping passage, i.e., the passage defined by the inlet slot 133, the throttling bores 109 to 113, the turbulence chambers 114 to 125, the interconnection channels 127 to 132, and the outlet slot 134. The flow of the pressurized gas therethrough corresponds to the diagrammatical representation of FIG. 7.

As in the earlier embodiment, the bores and channels in the embodiment of FIGS. 5–7 may also be provided with a relatively large cross section, yet nevertheless a high damping resistance may be achieved. For example, a construction provided with nine throttle bores, which have a diameter of 1 mm, has a damping effect that corresponds approximately to a single throttle bore of 0.35 mm to 0.4 mm. The cross section of the damping passage according to the invention is thus more than ten times as large as that of a conventional throttling bore in gas springs.

As the piston rod 104 is moved inward of the cylinder 101, the piston ring 141 moves from the position of FIG. 5 until it rests against the upper cover disc 135, so that an additional flow passage via the groove 142 and clearance 152 is established. This additional flow passage is parallel to the constantly opened damping passage, and thus the inward movement is less damped to substantially undamped.

If desired, the interconnecting channels 127, 128, 129, etc., which are straight in FIG. 6, may instead be formed as segments of arc or may be given any other appropriate configuration. The shape of the turbulence chambers 115, 116, etc. may likewise be varied to a large extent. For purposes of ease of manufacture, a funnel shape design is very favorable. The turbulence chambers may also be eccentric with respect to the bores 109, 110, etc.

Figure 8:
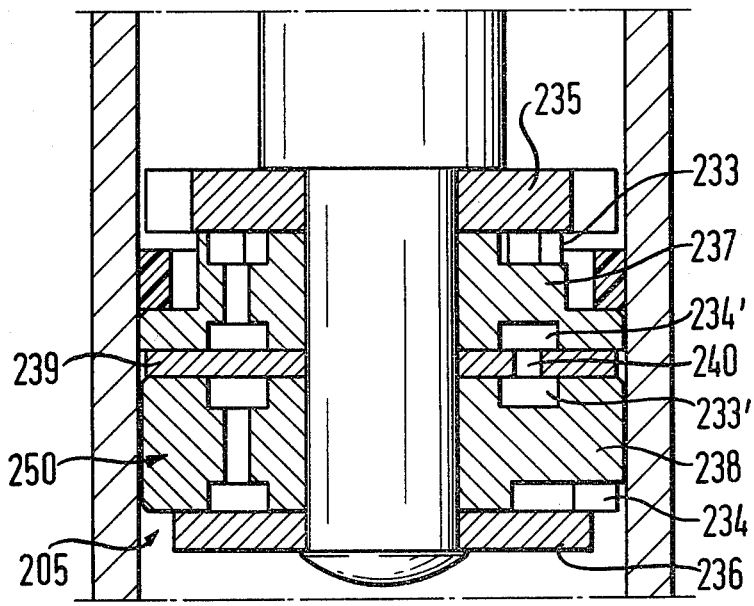
FIG. 8 is a sectional view of a piston unit consisting of two annular piston members having two fluid-passage structures connected in series.

In the embodiment of FIG. 8, the piston unit 250 is formed by two annular piston plates 237 and 238. The upper piston plate 237 is covered by the cover disc 235 and the lower piston plate 238 is covered by cover disc 236. Between the two piston plates 237 and 238, there is located a sealing washer 239 which is provided with an opening 240. This opening 240 connects the outlet opening 234' of the piston plate 237 to the inlet 233' of the piston plate 238, thereby connecting the damping passages of the two plates 237 and 238 in series. The inlet for the damping medium into the piston plate 237 is designated 233, while the piston plate 238 has an outlet 234. As will be appreciated, if the piston plates 237 and 238 are constructed according to FIGS. 5 to 7, such a piston unit will have double the number of throttle bores as the embodiment of FIGS. 5–7. Accordingly, a construction of this kind exhibits a higher damping resistance. A piston construction like that shown in FIG. 8, which consists of two piston plates, can also be formed with piston plates shaped like the piston member 5 shown in FIGS. 1 to 4.

In the embodiments described above, the damping resistance can be varied in a simple manner by varying the location of the outlet or the inlet of the passage along the circumference. For example, it is readily possible in FIGS. 5 to 7 to provide the inlet slot at the location of the turbulence chamber 118 and to leave the outlet slot 134 in the position shown in the drawing. The damping effect produced may therefore be readily adapted to suit the needs of a particular application.

The relatively large throttling cross section of the damping passage has the further advantage that the viscosity of the damping medium has a substantially reduced influence on the damping resistance.

Still another advantage of the invention is that the piston member 5 of FIGS. 1 to 4, the piston member 105 of FIGS. 5 to 7 and the piston plates 237, 238 of FIG. 8 can be made by sintering or plastic molding techniques. For instance, they may readily be injection molded, with attendant cost savings.

As can be seen from FIG. 6 (see for example the turbulence chamber 118 and the interconnecting channel 129), the rotational direction of turbulence occuring in the turbulence chamber 118 is substantially reversed when the fluid enters from the turbulence chamber 118 into the interconnection duct 129. This is achieved by the specific tangential position of subsequent turbulence chambers and interconnection channels. This reversal of the rotational direction further increases the flow resistance in the embodiment of FIGS. 5–7.

According to a feature of the invention, the cover discs or plates 35, 135 and 235 which cover the channel sections of the damping passage also define the annular grooves 42, 142, etc. accommodating the piston rings 41, 141, etc. This double function of the cover discs simplifies the design and the assembling of the piston unit.

Although the invention has been described with reference to specific embodiments thereof, many modifications and variations of such embodiments may be made by those skilled in the art without departing from the inventive concepts disclosed. All such modifications and variations, therefore, are intended to be included within the spirit and scope of the appended claims.

We claim:

1. In a cylinder-piston device, comprising:

a cylinder having an axis and two end walls;

a cavity defined within said cylinder;

an axially movable piston rod extending inward and outward of said cavity through an aperture in at least one of said end walls;

a piston unit within said cavity and operatively connected to said piston rod, said piston unit defining first and second working chambers within said cavity and including a piston member;

a fluid within said cavity; and at least one passage-defining means extending through said piston unit and connecting said first and second working chambers during at least part of the stroke of said piston unit with respect to said cylinder, the improvement in said piston unit wherein:

said passage-defining means includes means defining a substantially meander-shaped sequence of passage sections extending over at least part of the length of said passage;

said piston member has two axially directed end faces, each of said end faces lying in a plane substantially perpendicular to the axis of said cylinder;

said meander-shaped sequence of passage sections being defined by corresponding first and second sequences of channel sections, extending in a substantially circumferential direction around said axis of said cylinder, provided in each axially directed end face of the piston member of said piston unit;

said first and second sequence of channel sections each including means at one end thereof defining an opening to said first and second working chambers, respectively, said means at one end each comprising two adjacent radial passages, each radial passage having a cross sectional area less than the cross sectional area of said first and second sequences of channel sections, said first sequence of channel sections and said second sequence of channel sections being connected by at least one axial bore at a location remote from said one end thereof which at least one axial bore extends completely across the piston member of said piston unit; and first and second cover plates overlying each of said end faces and covering in a fluid-tight manner said respective first and second channel sections.

2. The cylinder-piston device of claim 1, wherein said passage sections define a substantially square-wave configuration.

3. The cylinder-piston device of claim 1, wherein adjacent ones of said passage sections are interconnected by means defining turbulence chambers.

4. The cylinder-piston device of claim 1, wherein said at least one axial bore is at the other end of said first and second sequences of channel sections.

5. The cylinder-piston device of claim 1, wherein said first and second channel sequences are arranged so that the circumferential direction of flow of said fluid through said second sequence of channel sections is reversed with respect to the circumferential direction of flow of said fluid through said first sequence of channel sections after said fluid flows through said at least one axial bore.

6. The cylinder-piston device of claim 1, wherein at least part of said first sequence of channel sections is in axial alignment with at least one similar part of said second sequence of channel sections.

7. The cylinder-piston device of claim 1, wherein said sequence of passage sections extends around substantially the entire circumference of said piston unit.

8. The cylinder-piston device of claim 7, wherein said sequence of passage sections comprises a plurality of substantially axial bores extending through a piston member of said piston unit, subsequent bores being interconnected at their axial ends by interconnection ducts extending in two different planes perpendicular to the axis of the cylinder, said planes being positioned adjacent opposite axial ends of said bores, and subsequent interconnection ducts being arranged alternatively in different planes.

9. The cylinder-piston device of claim 8, wherein said interconnection ducts are axially open channels embedded in end faces of said piston member, and said channels are covered by cover members overlying the end faces of said piston member.

10. The cylinder-piston device of claim 9, wherein turbulence chambers are defined at said axial ends of said axial bores by end sections of said axial bores having a diameter greater than the respective middle sections of said axial bores.

11. The cylinder-piston device of claim 9, wherein said interconnection ducts are tangential with respect to said turbulence chambers in such a way that a substantial reversal of the turbulence rotation occurs on entrance of fluid from a turbulence chamber into a subsequent interconnection duct.

12. The cylinder-piston device of claim 8, wherein said axial bores are provided in a circular arrangement around the axis of the cylinder, the angular spacing between adjacent bores being substantially equal.

13. The cylinder-piston device of claim 1, wherein said piston unit comprises a plurality of piston members adjacent each other in axial direction, each of said piston members being provided with at least one meander-shaped sequence of passage sections, said sequences of passage sections being connected in series.

14. The cylinder-piston device of claim 1, wherein said fluid-passage defining means includes means defining an additional fluid passage interconnecting said working chambers and having a variable flow cross section in response to the direction of movement of said piston rod with respect to said cylinder.

15. The cylinder-piston device of claim 1, wherein said first and second sequence of channel sections are connected by a plurality of axial bores.

16. The cylinder-piston device of claim 15, wherein one of said axial bores is located at the innermost end of said sequence of channel sections remote from said one end.

* * * * *